United States Patent

[11] 3,577,155

[72] Inventor Witold E. Swierczewski
Daly City, Calif.
[21] Appl. No. 791,395
[22] Filed Jan. 15, 1969
[45] Patented May 4, 1971
[73] Assignee American Telephone and Telegraph Company
New York, N.Y.

[54] ALLOTTER CIRCUIT FOR SEQUENTIAL INDICATION OF INCOMING TELEPHONE CALLS
7 Claims, 8 Drawing Figs.

[52] U.S. Cl. ........ 179/27, 179/94
[51] Int. Cl. ........ H04m 5/04
[50] Field of Search ........ 179/27 (CI), 27.1, 27.02, 27.25, 84L (Cursory), 94

[56] References Cited
UNITED STATES PATENTS
2,546,647 3/1951 Marble et al. ........ 179/94

*Primary Examiner*—William C. Cooper
*Assistant Examiner*—Thomas W. Brown
*Attorneys*—N. S. Ewing and James Warren Falk

ABSTRACT: A telephone call allotter circuit is disclosed for lighting the line lamps on an attendant console or switchboard, one at a time, in the same sequence in which calls arrive. A crossbar switch is interposed between the line relays and the line lamps. The horizontal magnets of the switch are operated sequentially in the order in which calls arrive. The line lamp of each line is associated with a respective vertical of the crossbar switch. Transfer contacts of relays controlled by the crossbar switch permit only one line lamp at a time to operate.

INVENTOR
W. E. SWIERCZEWSKI
BY Howard R Popper
ATTORNEY

START CIRCUIT 200

ALLOTTER CIRCUIT FOR SEQUENTIAL INDICATION OF INCOMING TELEPHONE CALLS

BACKGROUND OF THE INVENTION

This invention relates to telephone call allotter circuits and, more particularly, to circuits for indicating to an attendant at an answering position which of a plurality of incoming calls should be answered next.

When a plurality of incoming calls appear at an attendant position and are not immediately answered because all of the attendants are busy, either busy tone must be returned to the calling line or the unanswered calling lines must be held in abeyance until an idle attendant is available. In many installations such as at mail order sales desks, airline reservation desks, etc., it is commercially disadvantageous to return busy tone to a calling party and, accordingly, telephone equipment is provided which automatically holds these incoming calls until they can be answered by an attendant. The presence of a call which is waiting to be answered is usually indicated by an illuminated line lamp. In a large installation having a great number of incoming lines the lighting of the line lamps corresponding to all of the calling lines awaiting answer would create a confusing display for an attendant.

Heretofore, some semblance of order has been maintained at the attendant's position by one of two methods. Either one incoming line at a time is automatically connected to an attendant's position by the allotter circuitry, or all incoming lines are connected through to the attendant's position but only one line lamp at a time is lighted under control of the allotter. Both the routing of one call at a time and the lighting of one lamp at a time are accomplished in part by a lockout circuit. Any lockout circuit has an inherent priority due to its wiring configuration. This inherent priority created a distinct problem in the prior art arrangements. For example, if an attendant were busy while two incoming calls arrived, the next call routed to the attendant might not be the first to arrive but would be the one arriving over the higher priority line. When traffic to the attendant position was light, this created no particular problem since the other call would be answered shortly, even though not in the sequence of its arrival. However, when calling traffic is heavy, so that a number of calls are being held and new calls are arriving as fast as held calls are answered, it is possible for a call to arrive over a low priority line and wait an inordinate time to be answered. Under these heavy traffic conditions when a number of calls are being held and new calls continue to arrive it is to be expected that whenever the attendant becomes idle a higher priority call will always be waiting and will preempt the low priority call, eventually causing the low priority caller to lose patience and abandon the call.

It is therefore an object of this invention to provide a telephone call allotter circuit capable of registering the sequence of arrival of a plurality of calls at an attendant position and then displaying each call to the attendant in the exact sequence of its arrival.

SUMMARY OF THE INVENTION

The foregoing and other objects of my invention are achieved, in one illustrative embodiment, by providing a telephone call allotter circuit employing a crossbar switch having its verticals individually associated with the incoming lines and having its horizontals operated sequentially in the order in which calls arrive. The crossbar switch is arranged so that one of its crosspoints is closed as each call arrives, the closed crosspoint serving to prepare an operating path to a line lamp associated with the calling line. However, the path for the line lamp is not completed, unless this is the first call at the position, until the attendant answers the preceding call, the arrival of which had operated a correspondingly "earlier" horizontal level of the crossbar switch. Calls arriving while the attendant is answering a given call will operate the crosspoints of the verticals associated with the calling lines at the horizontal levels dictated by their precedence of arrival. The switch accordingly "stores" the calls on its crosspoints until answered and, as each call is answered, provides the operating path for illuminating the next call's line lamp.

When an attendant answers one of the calls, the operated crosspoint associated with that call is released. This enables an operating path to be completed to the line lamp of the calling line which had operated its crosspoint immediately succeeding the operation of the crosspoint just released. Calls that arrive after the aforementioned crosspoint has been released are not permitted to operate any crosspoint on the horizontal level of this just-released crosspoint until crosspoints associated with all subsequent horizontal levels of the crossbar switch have been operated. In this manner a later arriving call is prevented from operating a crosspoint that should only be associated with an earlier arriving call. When all of the horizontal levels have finally been selected and the attendant has answered the call associated with the last-operated horizontal level, all the horizontal levels are then freed to be seized sequentially by arriving calls.

In the illustrative embodiment described, 20 incoming lines are connected to verticals of a crossbar switch having 18 horizontal paths which are obtained by using a conventional 6-wire, 10-level crossbar switch and using two of the horizontal levels for selecting three, 2-wire paths at each of the remaining eight horizontal levels.

BRIEF DESCRIPTION OF THE DRAWING

The foregoing and other objects of the invention may be more readily comprehended from an examination of the following specification, the appended claims and drawings in which:

Figure 3:
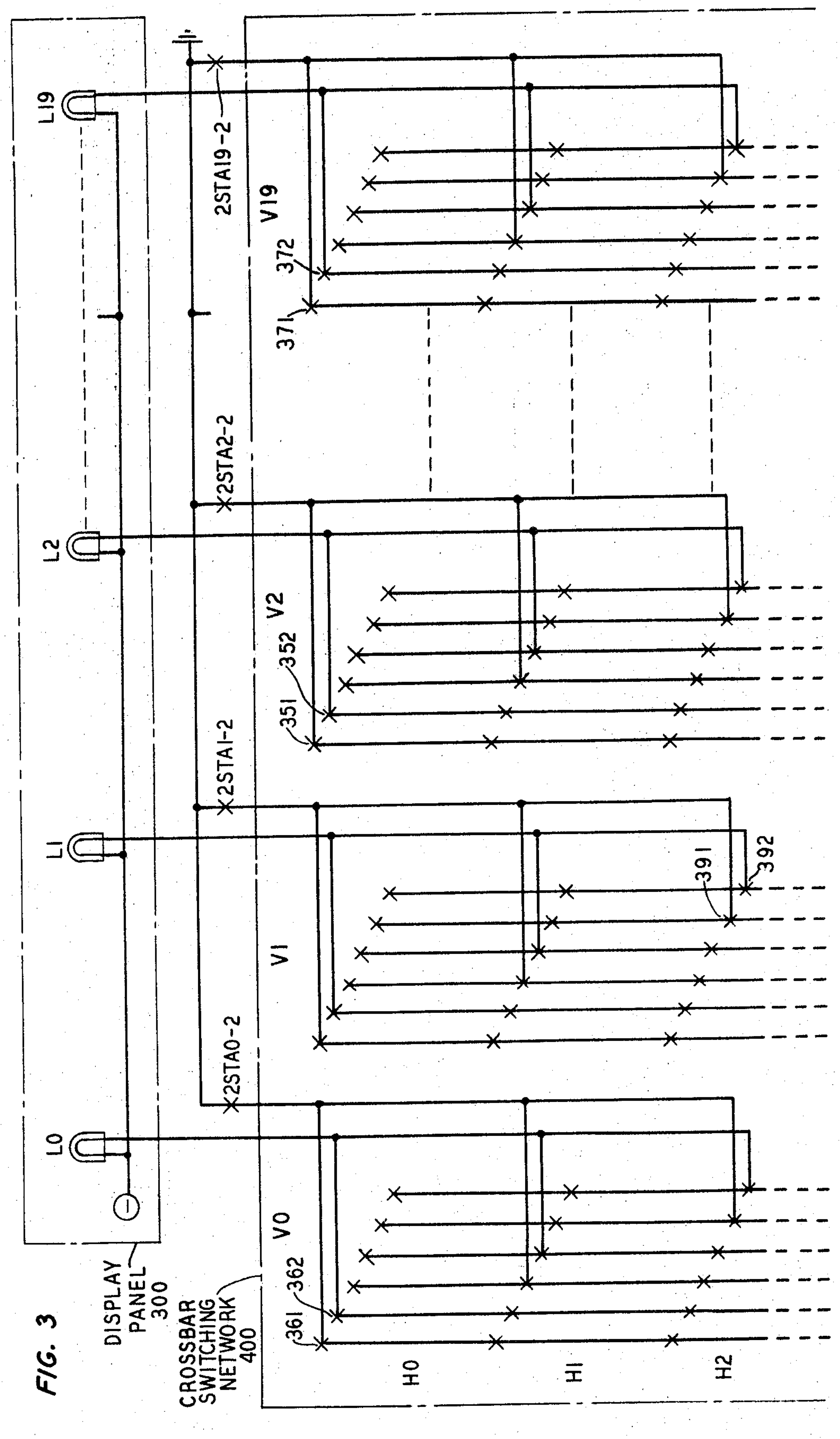
Figure 4:
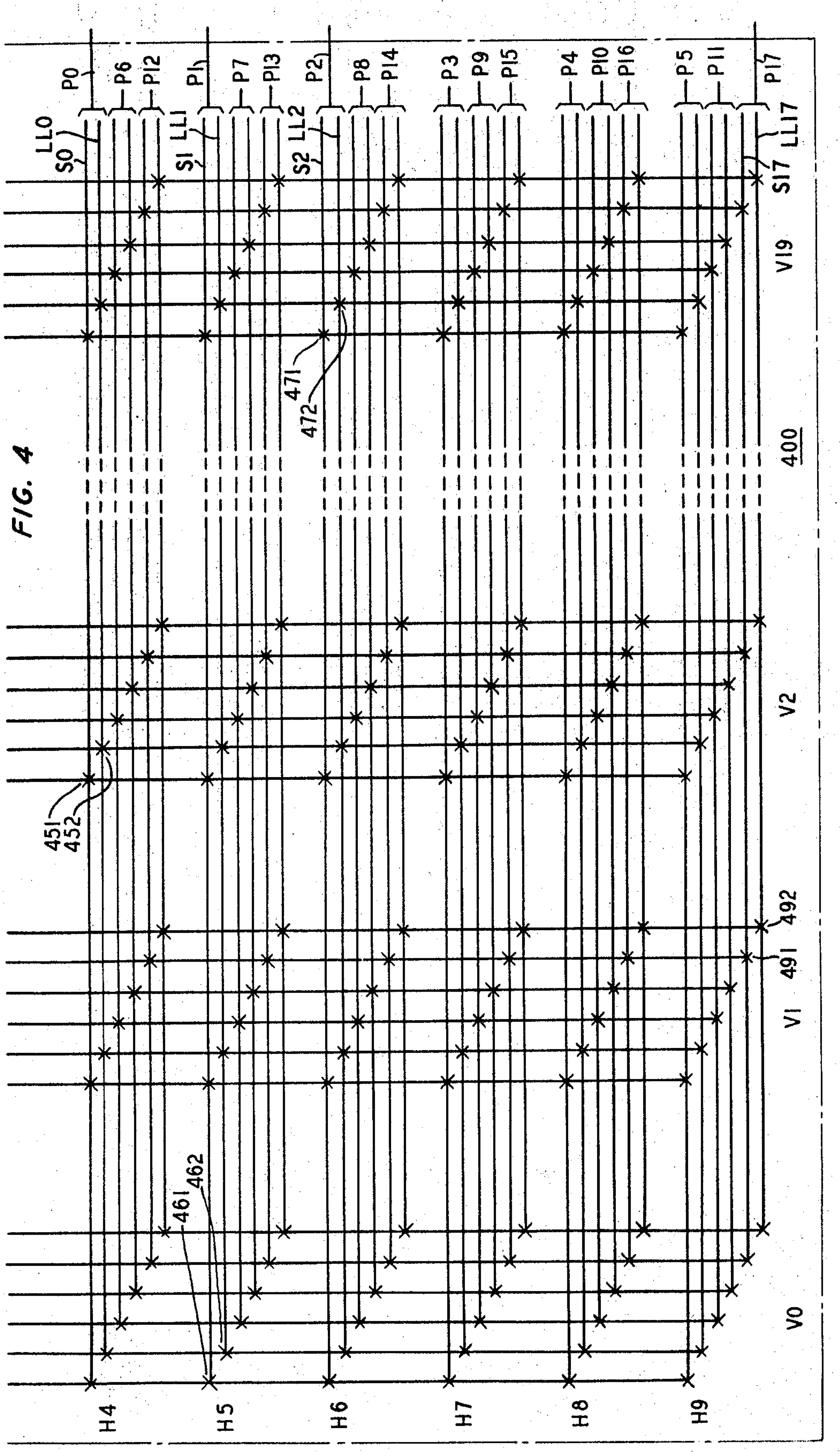
Figure 5:
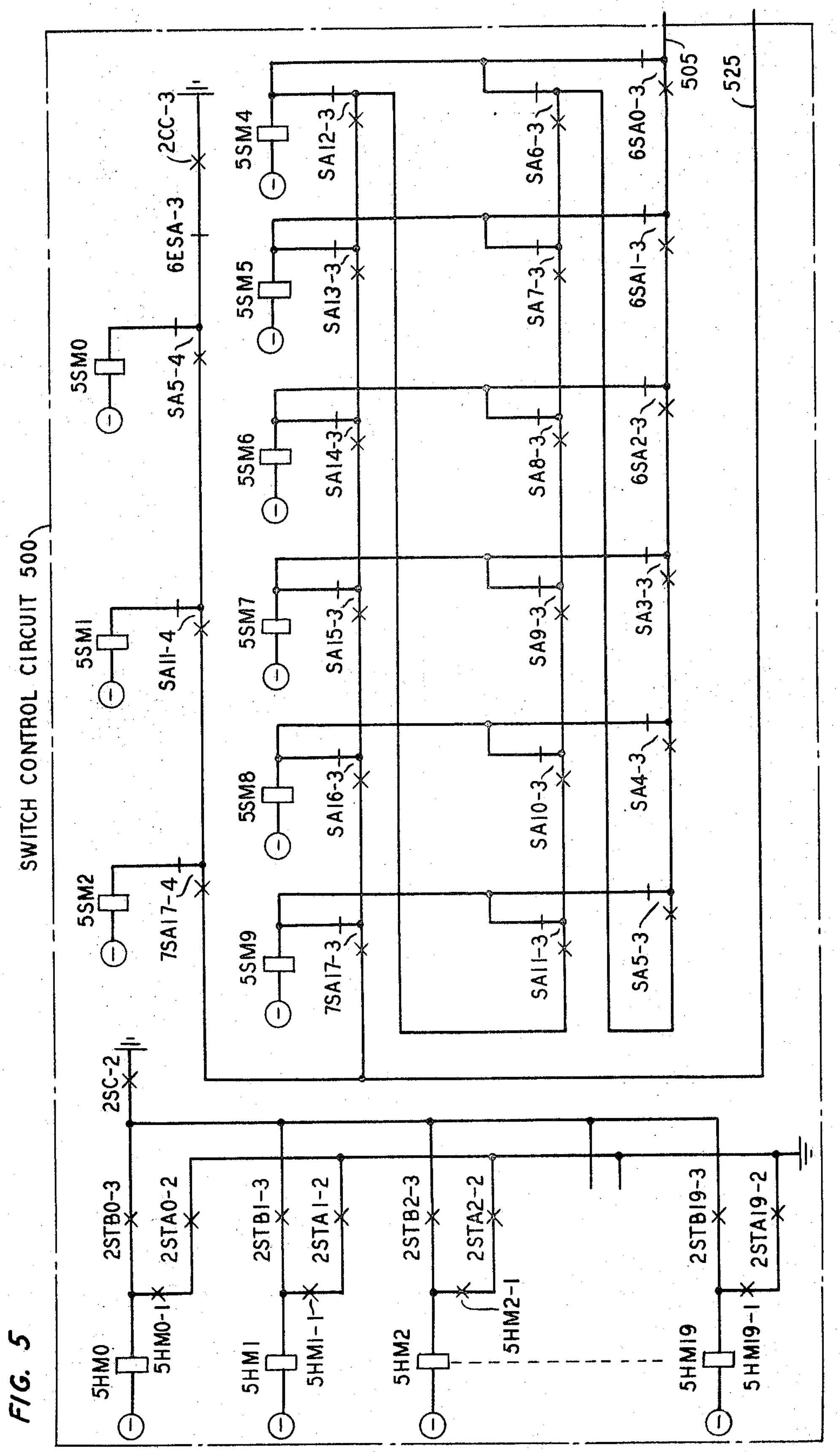
Figure 6:
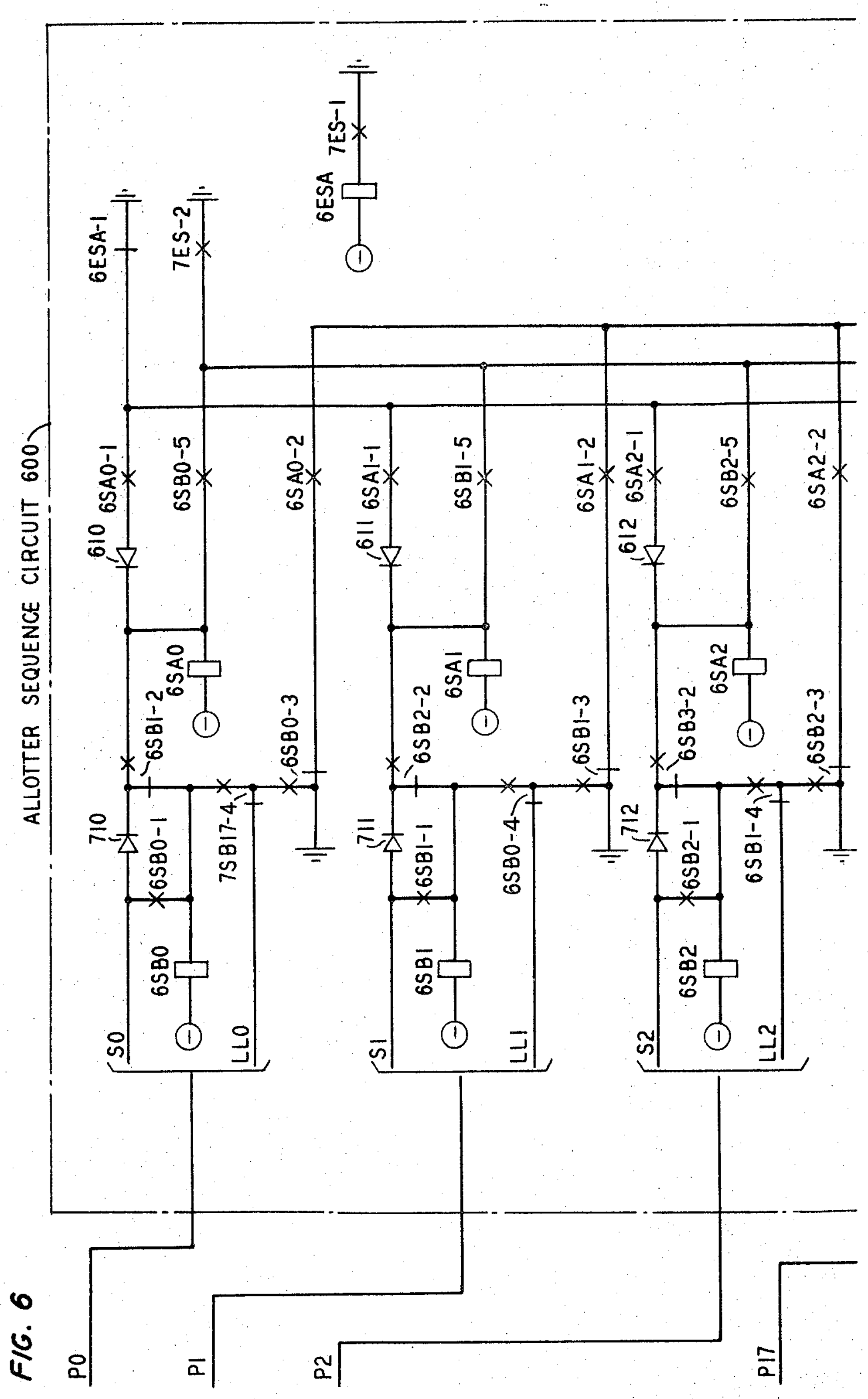
Figure 7:
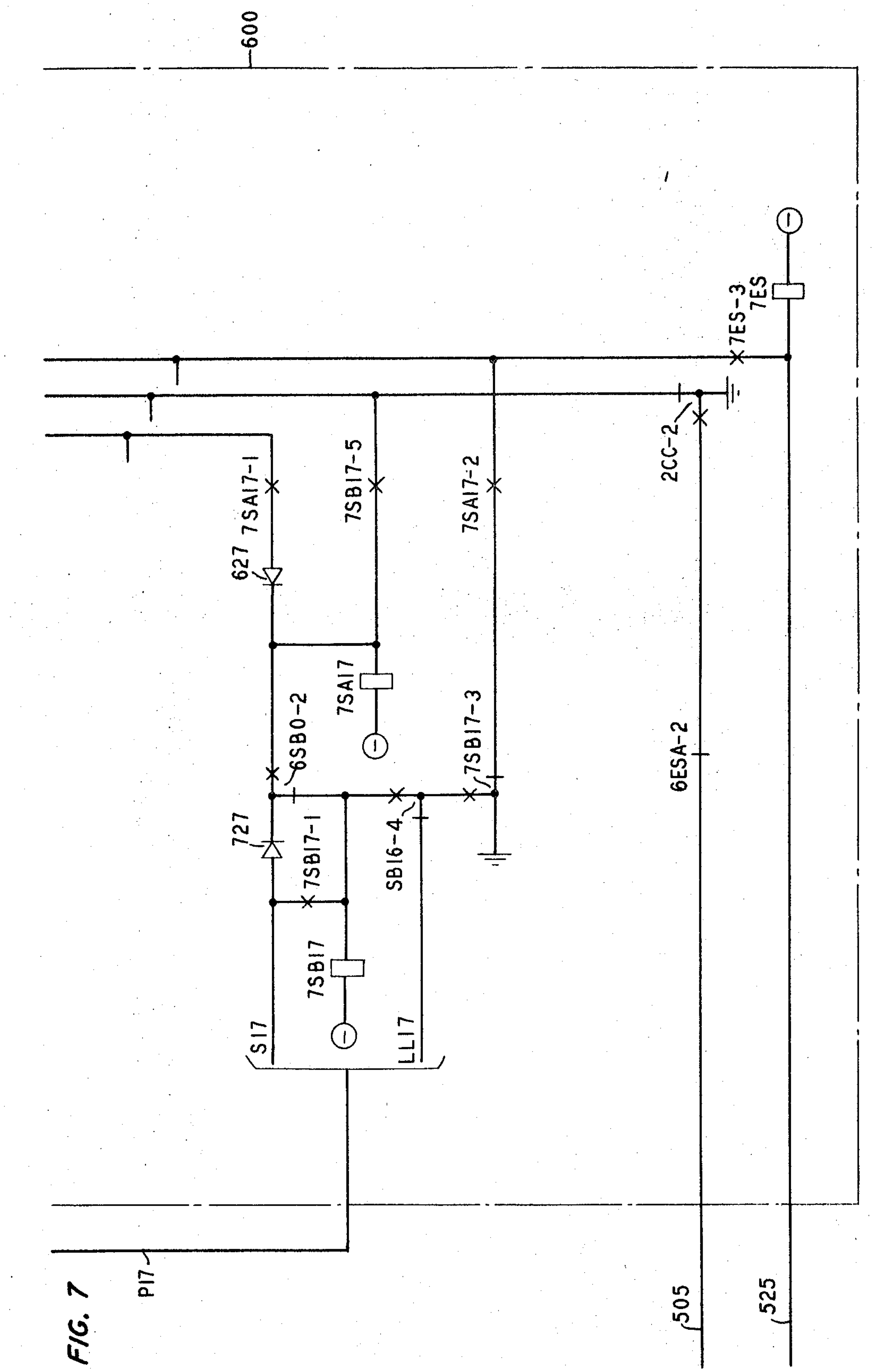

2 shows the start circuit which is responsive to operation of the line relays of the calling lines;

FIG. 3 shows the line lamps together with the upper two levels of the crossbar switch;

FIG. 4 shows the lower levels of the crossbar switch;

FIG. 5 shows a switch control circuit which includes the select and hold magnets for the crossbar switch;

FIGS. 6 and 7 show the sequence allotter circuit; and

Figures 1, 8:
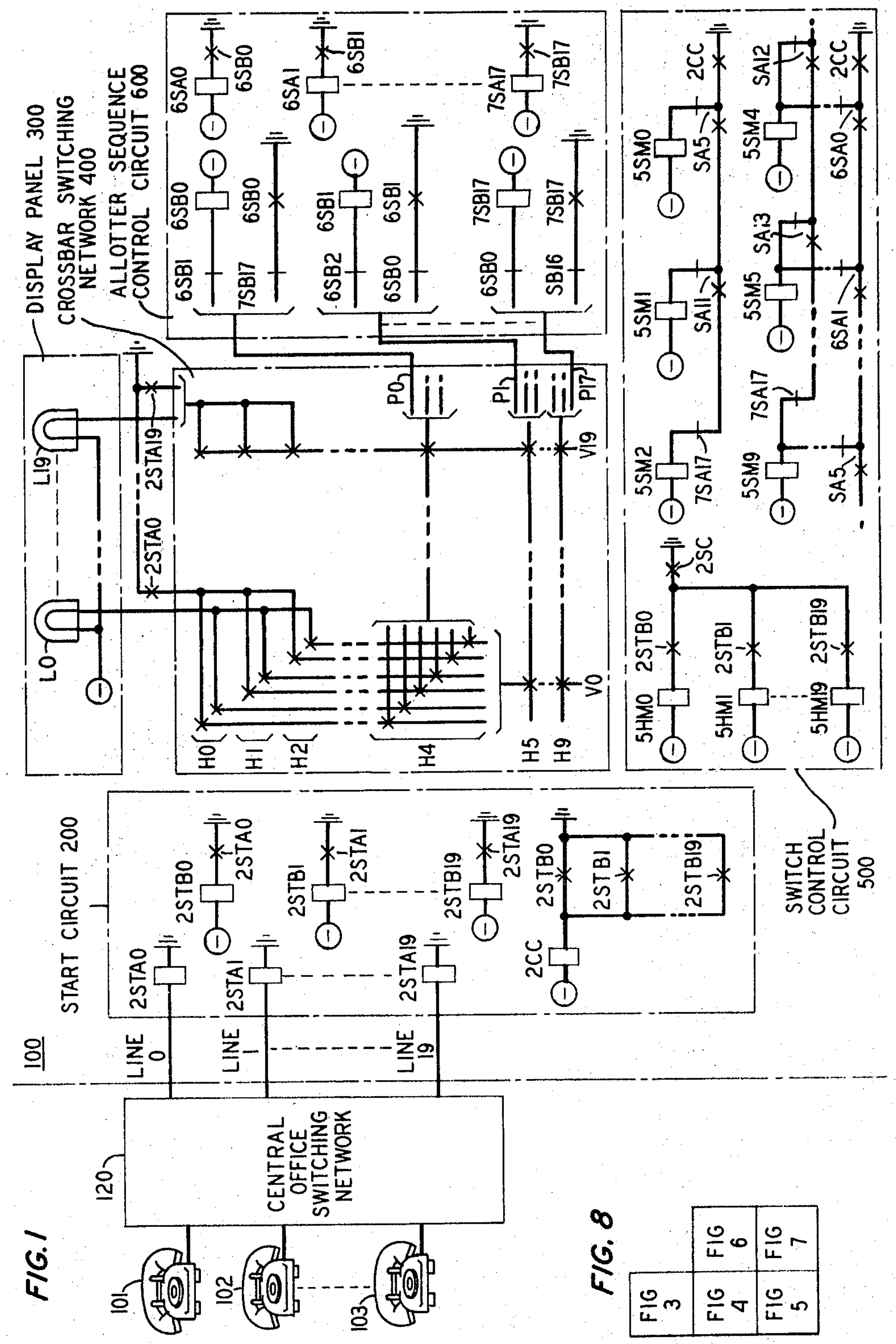
FIG. 1 shows an overall block diagram of a specific illustrative embodiment of the invention, the details of which are shown in FIGS. 2—7.

FIG. 8 shows the appropriate arrangement of FIGS. 3 through 7.

GENERAL DESCRIPTION

Referring now to FIG. 1, there is shown, in abbreviated schematic form, a telephone call allotter circuit 100 which may be associated with an attendant switchboard (not shown) so that a plurality of calls, arriving at the attendant switchboard over the plurality of incoming lines 0 through 19 from a central office switching network 120, may light the respective line lamps L0 through L19 on display panel 300 one at a time in the same sequence as the one in which the calls arrive. The operating paths for the lamps are prepared by crossbar switching network 400 operating under control of switch control circuit 500. The tip and ring leads associated with the incoming lines do not appear at the call allotter circuit and may be switched directly through the central office switching network 120 to the attendant switchboard in the conventional manner. Of course, as will be apparent to those skilled in the art, the tip and ring could be switched through network 400 if more wires per crosspoint were utilized than are depicted in the illustrative embodiment. To simplify the presentation however it will be assumed that network 400 does not switch the tip and ring conductors of the lines.

Each vertical of network 400 is associated with a particular incoming line and line lamp. The horizontal levels are associated with the order of call arrival. An incoming call operates its respective one of line relays 2STA0 through 2STA19 in start circuit 200. The operated line relay, in turn, operates the associated relay 2STB0 through 2STB19, also in start circuit 200. The operation of any 2STB– relay causes relay 2CC in start circuit 200 to operate. With relay 2CC operated, a path is completed in switch control circuit 500 to operate particular select magnets, one from the group 5SM0 through 5SM2, and one from the group 5SM4 through 5SM9.

The select magnets operate in a predetermined sequence through various contacts of relays 6SA0 through 6SA17 in the allotter sequence control circuit 600. The operation of the select magnets operates the 2SC relay whose winding is not shown in FIG. 1 but one of whose contacts, in switch control circuit 500, completes the operating path for the hold magnet 5HM0 through 5HM19 associated with the incoming line in control circuit 500. The operating of a horizontal and vertical magnet completes a path through crossbar switching network 400 to operate one relay of the group 6SB0 through 7SB17 in control circuit 600. For example, with crosspoints closed at vertical level V0 and horizontal levels H0 and H4, a path is completed from ground, through a make contact 2STA0, crosspoint V0/H0, crosspoint V0/H4, via pair P0 to circuit 600, and through a break contact 6SB1 to operate relay 6SB0. This in turn completes an operating path from ground in circuit 600, through a make contact 6SB0, a break contact 7SB17, via pair P0 to network 400, crosspoint V0/H4, and crosspoint V0/H0, to lamp L0 in display panel 300.

As each crosspoint connection is made in network 400, the relays in circuit 600 operate in sequence, one for each incoming call. The operation of a 6SB– relay in circuit 600 causes its associated 6SA– relay to operate, thereby preparing the operating paths for the next pair of select magnets to operate sequentially in control circuit 500. Operation of the 6SB– relay also partially completes a path, as will be explained later in more detail, through network 400 to operate the lamp L0 through L19, on display panel 300, associated with the next call in sequence to be answered. When one call is answered, its associated 6SB– relay releases, which completes the operating path for the lamp associated with the next call to be answered. This too will be explained in detail hereafter.

In the illustrative embodiment, a 2-wire path is required for allotting a sequence position to each arriving call. A conventional 10-horizontal level, 6-wire crossbar switch is employed so that the 6-wire crosspoints may serve three lines. In this manner, 18 effective horizontal levels are obtained and 18 sequence positions may be stored.

DETAILED DESCRIPTION

In the following detailed description it will be assumed that a first call is received on line 2 and "stored" on a crosspoint of network 400. Next a call will be received on line 0 and it too will be registered at a crosspoint with neither the first nor second call being immediately answered. Then a third call will be received on line 19 and it too will be held while none of the preceding calls is answered. At this point the first call, on line 2, will be answered. Thereafter it will be assumed that a number of calls continue to arrive without being answered until a call is received on line 1, which call will represent the last call which can be stored in network 400.

Arrival of First Call

Figure 2:
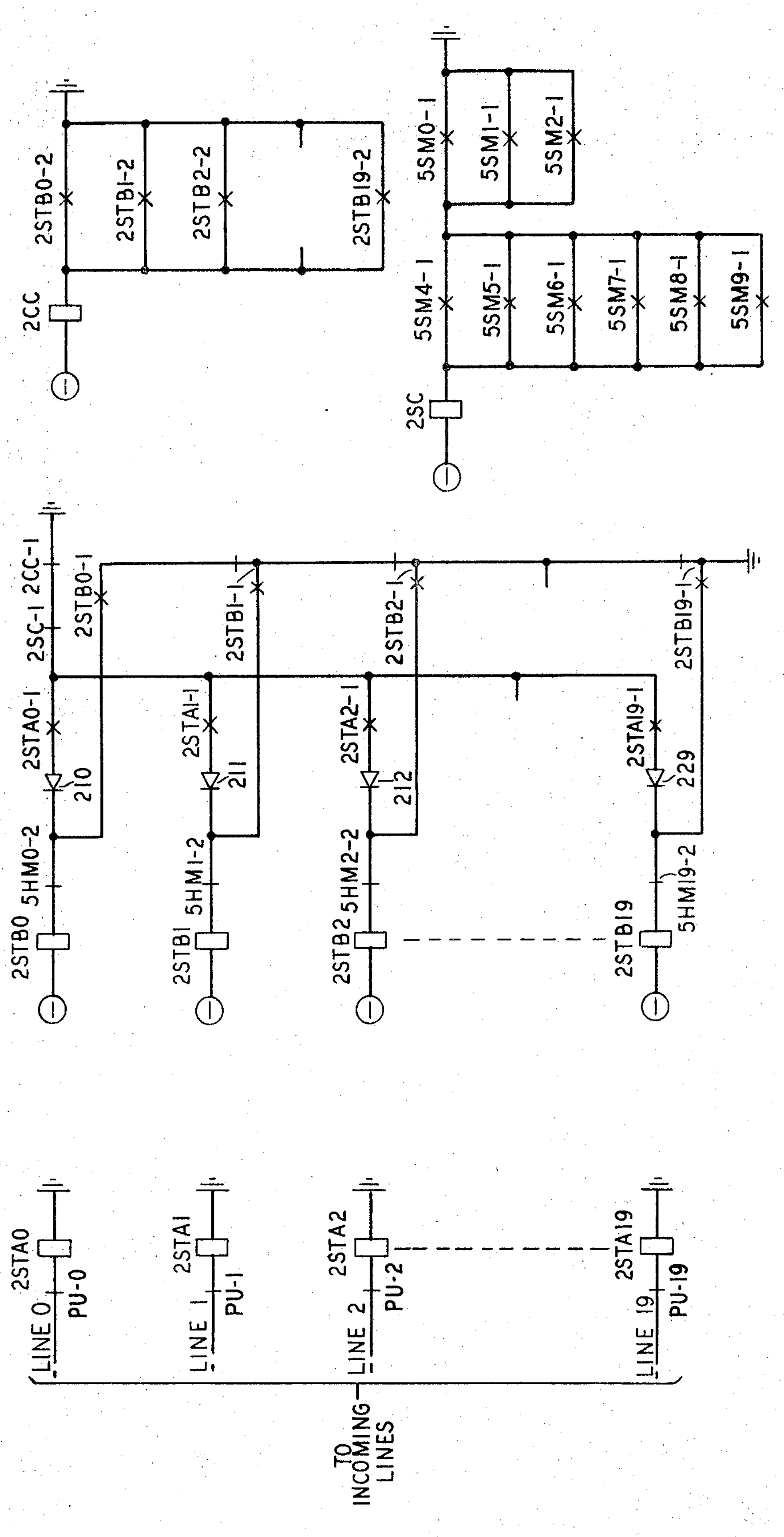

Assuming now that the first call in an illustrative sequence of incoming calls arrives on line 2, its line relay or other call detecting device (not shown) will in any conventional manner complete an operating path to line relay 2STA2 in start circuit 200, FIG. 2. In the following description all relays and magnets, such as relay 2STA2, are designated by an alpha-numerical code in which the leftmost number of the designation indicates the FIG. of the drawing in which the winding appears. Each contact of a relay or magnet is individually numbered, the contact number being given after the dash. Thus, the designation 2STA2–1 in the center of FIG. 2 indicates a first (make) contact of relay 2STA2. The winding of this relay is found at the left center of FIG. 2. All potential sources not otherwise marked are assumed to be −48 volts.

Relay 2STA2 having been operated, an operating path for relay 2STB2 is completed, which path may be traced from the winding of relay 2STB2 through break contact 5HM2–2 of hold magnet 5HM2, diode 212, make contact 2STA2–1 and break contacts 2SC–1 and 2CC–1 to ground. Upon operating, relay 2STB2 locks operated to ground through the make portion of its own transfer contacts 2STB2–1 and the break portion of the transfer contacts of relays 2STB3 through 2STB19, relays 2STB3 through 2STB18 being represented by the dotted line. Relay 2STB2 operated at its make contact 2STB2–2 completes an operating path for relay 2CC which operates and at its break contact 2CC–1 interrupts the original operating path for relay 2STB2 (and all other 2STB– relays, as well). Relay 2STB2 does not release due to the previously established holding path.

In operating, relay 2CC also completes operating paths for select magnets 5SM0 and 5SM4 in the switch control circuit 500 of FIG. 5. Select magnet 5SM0 operates over path including the break portion of transfer contacts SA5–4, break contact 6ESA–3 and make contact 2CC–3 to ground. The aforementioned contacts SA5–4 are not preceded by a numerical designation inasmuch as the winding of the SA5 relay is not shown in any FIG. of the drawing. Relay SA5 is one of the series of 18 similarly wired SA relays of which the first three are shown in FIG. 6 and the last is shown in FIG. 7. The operating path for select magnet 5SM4 includes the break portion of transfer contacts 6SA0–3, lead 505 to FIG. 7, break contact 6ESA–2 and the make portion of transfer contacts 2CC–2 to ground.

Operation of select magnet 5SM0 selects the uppermost horizontal level of contacts designated H0 of the crossbar switching network 400 in FIG. 3. Operation of select magnet 5SM4 selects the horizontal level designated H4 in FIG. 4. The operation of select magnets 5SM0 and 5SM4 at their respective contacts 5SM0–1 and 5SM4–1 in FIG. 2 completes the path for relay 2SC to operate.

Relay 2SC operated at its make contact 2SC–2 in FIG. 5 completes an operating path for hold magnet 5HM2 through previously operated make contact 2STB–3. Upon operating, hold magnet 5HM2 locks operated through its own make contact and make contact 2STA2–2 to ground. The operation of hold magnet 5HM2, with select magnets 5SM0 and 5SM4 operated, closes crosspoints of vertical V2 at horizontal levels H0 and H4 and completes the operating path for the first position of sequence allotter circuit 600. This path may be traced from ground in FIG. 3, through make contact 2STA2–2, crosspoints 351 and vertical V2 to crosspoints 451, at horizontal level H4 in FIG. 4, lead S0 of lead pair P0 to FIG. 6, diode 710, the break portion of transfer contacts 6SB1–2 to the winding of relay 6SB0. Relay 6SB0 operates and locks to lead S0 through its make contact 6SB0–1. Relay 6SB0 operated completes a path for lighting line lamp L2 on display panel 300, which path may be traced from ground in FIG. 6, through the make portion of transfer contacts 6SB0–3, the break portion of transfer contacts 7SB17–4 to lead LL0 of lead pair P0 at horizontal level H4, through crosspoints 452 and 352 at vertical V2 to lamp L2 in FIG. 3. Lamp L2 lights to indicate that line 2 has an incoming call, and that that call presently has the longest "waiting" time. It should be noted that this path was completed over a break contact of released relay 7SB17 which relay, as hereinafter to be described, would only be operated if there had been 17 previously unanswered calls stored at crosspoints in network 400.

When hold magnet 5HM2 operates to close the crosspoints, its break contact 5HM2–2 in FIG. 2 opens the hold path for relay 2STB2 which releases. The release of relay 2STB2 at its released make contact 2STB2–2, causes relay 2CC to release, which, at its released make contacts 2CC–3 in FIG. 5 and 2CC–2 in FIG. 7, releases the operated select magnets 5SM0 and 5SM4. The release of the select magnets, 5SM0–1 and 5SM4–1 contacts in FIG. 2, opens the operate path of relay 2SC. Relay 2SC released interrupts the operating path for all of the hold magnets in FIG. 5 except hold magnet 5HM2 which by its locking path is held operated so long as line 2 maintains relay 2STA2 operated.

The release of relay 2CC, at its released break contact 2CC–2 in FIG. 7, completes an operating path through operated make contacts 6SB0–5 for the relay 6SA0 in FIG. 6. Relay 6SA0 locks operated through diode 610, its own make contact 6SA0–1 and break contact 6ESA–1 to ground. Diode 710 is provided to isolate the winding of relay 6SB0 from the grounding provided over contact 6SA0–1 so that relay 6SBO may be held operated only through the ground provided over the closed crosspoints of network 400. Accordingly, relay 6SB0 remains operated so long as a call is present on line 2. The circuit is now ready to allot a position to the next incoming call.

Arrival of Second Call

Assuming that the next incoming call arrives over line 0, the associated line relay 2STA0 will be operated. Since relay 2SC has released, the operating path for the 2STB0 relay is completed through break contact 5HM0–2, diode 210, make contact 2STA0–1, and break contacts 2SC–1 and 2CC–1 to ground. Once operated, relay 2STB0 locks operated through break contact 5HM0–2, the make portion of its own transfer contacts 2STB0–1 and the break portion of transfer contacts 2STB1–1 through 2STB19–1 to ground. Relay 2CC is operated by make contact 2STB0–2, and, at its operated make contact 2CC–3 in FIG. 5, completes the operating path for select magnet 5SM0. In addition, relay 2CC operated, at the make contact of its transfer contacts 2CC–2 in FIG. 7, applies operating ground through break contact 6ESA–2 to FIG. 5 via lead 505. Ground on lead 505 is applied over the make portion of transfer contacts 6SA0–3 and the break portion of transfer contacts 6SA1–3 to select magnet 5SM5. Operation of select magnets 5SM0 and 5SM5 at their respective contacts 5SM0–1 and 5SM5–1 in FIG. 2 completes an operating path for relay 2SC. Relay 2SC operated at its make contacts 2SC–2 in FIG. 5 completes an operating path for hold magnet 5HM0 through make contact 2STB0–3. Hold magnet 5HM0 locks operated through its own make contact and make contact 2STA0–2 to ground.

The operation of hold magnet 5HM0 at its break contact 5HM0–2 in FIG. 2 opens the holding path for relay 2STB0, which releases, releasing relay 2CC. The release of relay 2CC releases select magnets 5SM0 and 5SM5, which release relay 2SC.

The closure of crosspoints of vertical V0 at levels H0, FIG. 3, and level H5, FIG. 4, completes an operating path for relay 6SB1 in FIG. 6 which may be traced from ground in FIG. 3 through make contact 2STA0–2, closed crosspoints 361 and vertical V0 to crosspoints 461 in FIG. 4, lead S1 of lead pair P1 to FIG. 6, through diode 711, and the break portion of transfer contacts 6SB2–2 to the winding of relay 6SB1. On operating, relay 6SB1 locks to lead S1 through its own make contact 6SB1–1. The operating path for the L0 lamp on display panel 300 is partially completed through network 400 at closed crosspoints 362 and 462, to lead LL1 in FIG. 6 where it is interrupted by the break portion of transfer contacts 6SB0–4. Relay 6SB0 was operated by the first call and will remain operated until that call is answered. Relay 6SB1 operated, operates relay 6SA1 through make contact 6SB1–5 and the break portion of transfer contacts 2CC–2 to ground in FIG. 7. Relay 6SA1 then locks operated through diode 611, its own make contact 6SA1–1 and break contact 6ESA–1 to ground. Diode 711 isolates the S1 lead from the locking path of relay 6SA1 so that relay 6SB1 is locked operated only through network 400 via lead S1. Hold magnet 5HM0 and relays 6SB1 and 6SA1 are held operated through their established holding paths.

Arrival of Third Call

Assuming that a third call now arrives via line 19, the associated relay 2STA19 operates and in turn operates relay 2STB19 over a path including break contact 5HM19–2, diode 229, make contact 2STA19–1 and break contacts 2SC–1 and 2CC–1 to ground. Relay 2STB19 locks operated through the break contact 5HM19–2 of hold magnet 5HM19 and the make portion of its own transfer contacts 2STB19–1 to ground. As before, relay 2CC operates and completes the operating path for a pair of select magnets in FIG. 5. Select magnet 5SM0 operates as it did previously, while select magnet 5SM6 operates through the break portion of transfer contacts 6SA2–3, the make portion of transfer contacts 6SA1–3 and 6SA0–3, over lead 505 to FIG. 7, through break contact 6ESA–2 and the make portion of transfer contacts 2CC–2 to ground. Relay 2SC operates over an obvious path and, in FIG. 5, completes the operating path for hold magnet 5HM19 in series with operated make contact 5STB19–3. Hold magnet 5HM19 operated locks operated through its own make contact and make contact 2STA19–2 to ground. In a manner similar to that previously described, the 6SB2 relay operates through closed crosspoints 371 and 471 and the operating path for lamp L19 is completed through network 400 via crosspoints 372 and 472 to lead S2, where it is interrupted by the break portion of transfer contacts 6SB1–4. Relay 6SA2 operates through the make contact 6SB2–5 and the make portion of transfer contacts 2CC–2 to ground. It then locks operated through diode 612, its own make contact and break contact 6ESA–1 to ground. Diode 712 isolates the S2 lead from the above locking path so that relay 6SB2 is locked operated only through network 400 via lead S2. In operating, hold magnet 5HM19 also precipitates the release of the position allotting portion of the circuit, as previously described. Hold magnet 5HM19, and relays 6SB2 and 6SA2 are held operated through their respective holding paths.

Call Answered by Attendant

Lamp L2, associated with incoming line 2, over which the first call arrived, is still lighted. When the attendant becomes available and answers the call on line 2 she does so by operating a pickup key whose break contact PU2 opens the operating path for line relay 2STA2. The release of relay 2STA2 at its released make contact 2STA2–2, in FIG. 3, removes ground from crosspoints 351 and 451 and interrupts the S0 lead holding path for relay 6SB0 in FIG. 6 which relay also releases. The release of relay 6SB0 interrupts the LL0 lead operating path for lamp L2 in FIG. 3 and lamp L2 is extinguished. At the same time, the operating path for lamp L0 which was partially completed by the operation of crosspoints 362 and 462 when the second call arrived over line 0 is now completed to lead LL1 in FIG. 6 over the break portion of transfer contacts 6SB0–4 and the make portion of transfer contacts 6SB1–3 to ground. Lamp L0 now operates to indicate that line 0 has the next call in sequence.

Arrival of the Eighteenth Call

Let it be assumed that the eighteenth call arrives over line 1. Relays 2STA1 and 2STB1 in FIG. 2 operate in the manner previously described. Select magnets 5SM2 and 5SM9 in FIG. 5 operate when make contacts 2CC–2 and 2CC–3 operate. The path for select magnet 5SM2 includes the break portion of transfer contacts 7SA17–4, the make portions of transfer contacts SA11–4 and SA5–4, break contact 6ESA–3 and make contact 2CC–3 to ground. Select magnet 5SM9 operates over a path including the break portion of transfer contacts 6SA17–3, the make portion of transfer contacts SA16–3 through 6SA0–3, over lead 505 to FIG. 7, through break contact 6ESA–2, and the make portion of transfer contacts 2CC–2 to ground. The operation of select magnets 5SM2 and 5SM9 completes an obvious path for the operation of relay 2SC. Hold magnet 5HM1 then operates over a path from it winding through make contacts 2STB1–3 and 2SC–2 to ground. Once operated, hold magnet 5HM1 locks operated through its own make contact and make contact 2STA1–2 to ground.

In operating, hold magnet 5HM1 opens both the operating and holding paths for relay 2STB1 at its break contact 5HM1–2 in FIG. 2. The release of relay 2STB1 initiates the release of relay 2CC, select magnets 5SM2 and 5SM9, and relay 2SC.

The operation of hold magnet 5HM1 also results in the closure of crosspoints on vertical V1 at horizontal levels H2 and H9. This completes an operating path for relay 7SB17 which may be traced from ground in FIG. 3 through make contact 2STA1–2, closed crosspoints 391 and vertical V1 to closed crosspoints 491 in FIG. 4, lead S17 of lead pair P17 to FIG. 7, through diode 727, the break portion of transfer contacts 6SB0–2 to the winding of relay 7SB17. Relay 7SB17 operated, locks to lead S17 through its own make contact 7SB17–1. The operating path for lamp L1 on display panel 300 is partially completed, through network 400 at closed crosspoints 392 and 492, to lead LL17 where it is interrupted by the break portion of transfer contacts SB16–4. Relay 7SA17 is also operated through make contact 7SB17–5 and the break portion of transfer contacts 2CC–2 to ground and then locks operated through diode 627, its own make contact and break contact 6ESA–1 to ground in FIG. 6. Diode 727 isolates the S17 lead from the locking path for relay 7SA17. This insures that relay 7SB17 is held operated only via lead S17 through network 400.

The allotting of the eighteenth position initiates an end-of-sequence operation. The operating path for the 7ES relay has been partially completed from its winding, via lead 525 to FIG. 5, through two parallel paths. The first includes the make portions of transfer pairs 7SA17–4, SA11–4 and SA5–4, and through break contact 6ESA–3 to the unoperated make contact 2CC–3. The second path includes the make portions of transfer pairs 7SA17–3 through 6SA0–3, to FIG. 7 via lead 505, and through break contact 6ESA–2 to the unoperated make portion of transfer pair 2CC–2. The arrival of the next call (nineteenth) will cause relay 2CC to operate once again, completing these parallel operating paths for relay 7ES through make contacts 2CC–2 and 2CC–3 to ground. The operation of relay 7ES completes an obvious path for the operation of relay 6ESA in FIG. 6. The operation of relay 6ESA interrupts the operating path for the 7ES relay by opening its break contact 6ESA–3 in FIG. 5.

If none of the previously allotted calls have been answered, relay 7ES would release and cause busy tone to be returned to the calling party (through means not shown). If, on the other hand, one or more calls have been answered so that earlier assigned allotter positions are once more available, relay 7ES would be held operated through a supplementary path. For example, in the sequence described above, the first call, received over line 2, has been answered. Its associated relays 2STA2 and 2STB2 have released, as has the 6SB0 relay associated with its allotted position. Relay 6SA0, however, was held operated over its locking path through diode 610, its own make contact and break contact 6ESA–1 to ground. Therefore, a supplementary holding path for relay 7ES is completed from its winding, through its own make contact 7ES–3 to FIG. 6, through make contact 6SA0–2, and through the break portion of transfer contact 6SB0–3 to ground.

The operation of relays 7ES and 6ESA serve to release the allotter positions assigned to previously answered calls. The holding path for the SA– relays is interrupted at break contact 6ESA–1 in FIG. 6. At the same time, a supplementary locking path is completed in FIG. 6 through make contact 7ES–2 to ground. However, instead of holding operated all the previously operated SA– relays, this supplementary path holds only those SA– relays whose associated SB– relays are also operated (those associated with unanswered calls). In the sequence detailed above, relay 6SA0 should now release since its supplementary path is interrupted at make contact 6SB0–5. If diode 610 were not present, relay 6SA0 would not release when the holding path through contact 6ESA–1 to ground was interrupted. Instead, an additional, unwanted holding path would be present through its own make contact 6SA0–1, make contacts 6SA1–2 and 6SB1–5 (both relays 6SA1 and 6SB1 are still operated, since the call at allotter position 1 is unanswered), and through make contact 7ES–2 to ground. Diodes 610 through 627 are present to prevent this unintended holding path from being established. The remaining SA– relays are held operated through make contacts 6SB1–5 through 7SB17–5 since relays 6SB1 through 7SB17 are still operated. The first allotter position would be cleared, however, permitting its reallotment on the nineteenth call.

Abandoned Calls

Assume now that after being allotted position 1 and while lamp L2 is still lighted, the call placed over line 0 is subsequently abandoned. The 2STA0 relay, hold magnet 5HM0 and crosspoints 361, 362 and 461, 462 would all release. If relay 6SB1 were permitted to release, the operating path for lamp L19 would be completed from the LL2 lead through the break portion of transfer contacts 6SB1–4 and make portion of transfer contacts 6SB2–3 to ground. This would be undesirable since two lamps would now light on display panel 300 rather than only one as desired. Instead of permitting the SB– relay to release when the call allotted to a previous position has not been answered, the circuit holds that relay operated over a supplemental path. In the immediate case, the 6SB1 relay is held operated through the make portion of transfer contacts 6SB0–4 and the make portion of its own transfer to ground. This insures the lighting of the line lamps in proper sequence, as well as insuring that only one lamp on display panel 300 will be lighted at one time. Subsequently, when the call on line 2 is answered, not only will the 6SB0 relay release as described above, but the 6SB1 relay associated with the abandoned call will also release. The line lamp associated with position 2 (L19) will then be lighted, as it becomes the next call in sequence to be answered.

It is to be understood that the embodiment just described is illustrative of the principles of my invention. Other arrangements may be devised by those skilled in the art which do not depart from the spirit and scope of this invention. For example, while the illustrative embodiment described the operation of a crossbar switching network, other coordinate-type switching arrays could be employed instead.

I claim:

1. A display lamp control circuit for a plurality of line lamps each associated with a telephone line, comprising a coordinate switching array having a plurality of interconnectable horizontal and vertical conductor paths, said line lamps each being associated with a respective one of said vertical paths;

means responsive to a call from one said associated telephone line for automatically interconnecting one of said horizontal conductor paths with the vertical conductor path associated with the line lamp associated with said calling line;

first circuit means operable upon the interconnection in said array of said one horizontal and said one vertical conductor paths for preparing an operating path to another of said horizontal paths immediately succeeding said one horizontal path; and second circuit means connected to said horizontal conductor paths for controlling said first circuit means and operable in response to the answering of said call from said calling line for completing an operating path to the one of said line lamps associated with the vertical path of an interconnection in said array which includes said immediately succeeding horizontal path.

2. A display lamp control circuit in accordance with claim 1, wherein said coordinate switching array comprises a crossbar switch, and wherein each of said horizontal conductor paths comprises a first and a second conductor, said first circuit means includes relay means connected to said first conductor, and said second circuit means includes said second conductor and means controlled by said relay means connected to said first conductor of said one horizontal path for operating said line lamp over said completed path.

3. A display lamp control circuit for a telephone call allotter circuit including a plurality of telephone lines each having a line lamp associated therewith;

a crossbar switch having a plurality of horizontal and vertical conductor paths and horizontal and vertical magnets operable to establish a plurality of interconnections between said horizontal and vertical paths, said vertical conductor paths being associated with respective ones of said lines;

and means for lighting one at a time the line lamps associated with calling ones of said lines comprising:

means connected to said horizontal conductor paths for selectively operating successive ones of said horizontal magnets of said switch;

means responsive to each operation of one of said horizontal magnets for operating the one of said plurality of vertical magnets corresponding to a calling one of said lines;

and means operative when one said interconnection established through said switch is released for completing the operating path to one of said plurality of line lamps and for opening the operating path to another of said line lamps associated with said telephone lines.

4. A display lamp control circuit in accordance with claim 3, wherein said means for selectively operating said horizontal magnets comprises a plurality of relays equal in number to said horizontal magnets and operable sequentially, each of said relays being operable to prevent reoperation of an associated one of said horizontal magnets when the interconnection established by said associated one of said horizontal magnets is released.

5. A display lamp control circuit in accordance with claim 4, further comprising means responsive to the release of the interconnection established by the last operable one of said horizontal magnets for releasing all of said plurality of relays.

6. A sequential control circuit comprising a plurality of lines capable of exhibiting service requests, a coordinate switching array having a plurality of horizontal paths and a number of vertical paths equal to the number of said lines, each of said vertical paths corresponding to a particular one of said lines, means for establishing a crosspoint connection in said array between one of said horizontal paths and the vertical path corresponding to a service-requesting one of said lines for each of said lines in the service-requesting condition, a service request display means associated with each of said lines, said display means having its operating path prepared by a crosspoint connection between its corresponding vertical path and a sequentially selected one of said horizontal paths, means controlled by the crosspoint connection established to the first of said sequentially selected horizontal paths for completing the operating path for one of said display means, and means controlled by the release of said last-mentioned crosspoint connection for completing the display device operating path prepared by the next sequentially selected one of said horizontal paths.

7. A telephone call allotter circuit comprising a plurality of telephone lines each having a line lamp associated therewith;

a line relay associated with each of said lines, said relay being operable in response to the arrival of a call over a respective one of said lines;

a coordinate switching array having a number of horizontal paths equal to the maximum number of calls desired to be held without being answered and a number of vertical conductor paths equal to the number of said telephone lines;

means responsive to the operation of each of said line relays for selecting one of said horizontal paths dependent upon the number of said horizontal paths which have previously been selected;

means for completing a crosspoint connection in said array at the intersection of said selected one of said horizontal paths with the one of said vertical paths corresponding to said respective one of said lines, each said crosspoint connection being effective to prepare an operating path to the line lamp associated with a respective calling one of said plurality of lines; and means responsive to the release of one of said line relays for completing one of said prepared line lamp operating paths.